US008658965B2

(12) United States Patent
An et al.

(10) Patent No.: US 8,658,965 B2
(45) Date of Patent: Feb. 25, 2014

(54) ENCODER HAVING A PATTERN TRACK INCLUDING DIFFERENT-WIDTH PATTERNS

(75) Inventors: Min-ha An, Changwon (KR); Hyong-su Choi, Changwon (KR); Tae-young Lee, Changwon (KR); Dong-ju Seok, Changwon (KR)

(73) Assignee: Samsung Techwin Co., Ltd., Changwon-city (KR)

( * ) Notice: Subject to any disclaimer, the term of this patent is extended or adjusted under 35 U.S.C. 154(b) by 394 days.

(21) Appl. No.: 12/983,568

(22) Filed: Jan. 3, 2011

(65) Prior Publication Data
US 2011/0210238 A1 Sep. 1, 2011

(30) Foreign Application Priority Data

Feb. 26, 2010 (KR) .......................... 10-2010-0017925

(51) Int. Cl.
*G01D 5/34* (2006.01)
*G01B 17/00* (2006.01)
*G01B 5/24* (2006.01)
*G01D 5/347* (2006.01)

(52) U.S. Cl.
USPC ............ 250/231.13; 33/1 PT; 33/1 N; 33/707

(58) Field of Classification Search
USPC ................ 250/231.1–231.18, 221, 233, 234; 33/1 PT, 1 N, 707; 341/13, 14
See application file for complete search history.

(56) References Cited

U.S. PATENT DOCUMENTS

| 4,914,437 | A  | * | 4/1990 | Kibrick et al. ..................... 341/3 |
| 5,563,408 | A  | * | 10/1996 | Matsumoto et al. ..... 250/231.14 |
| 6,232,595 | B1 | * | 5/2001 | Okamuro et al. ........ 250/231.16 |

* cited by examiner

*Primary Examiner* — Thanh Luu
*Assistant Examiner* — Renee Naphas
(74) *Attorney, Agent, or Firm* — Sughrue Mion, PLLC

(57) ABSTRACT

An encoder which measures displacement of a moving part includes a light-emitting unit; a moving part which moves relative to the light-emitting unit; a first pattern track which includes a plurality of first unit patterns sequentially formed on the moving part, separated from one another and having different widths; a first light-receiving unit which is disposed to correspond to the light-emitting unit and detects first information light received from the light-emitting unit via a first pattern of the first unit patterns; at least one second light-receiving unit which is disposed to correspond to the light-emitting unit and detects second information about light received from the light-emitting unit via at least one second pattern of the first unit patterns; and a displacement calculating unit which calculates a relative displacement of the moving part with respect to a reference position based on the first and second information.

8 Claims, 11 Drawing Sheets

… (1) …

ENCODER HAVING A PATTERN TRACK INCLUDING DIFFERENT-WIDTH PATTERNS

CROSS-REFERENCE TO RELATED PATENT APPLICATION

This application claims priority from Korean Patent Application No. 10-2010-0017925, filed on Feb. 26, 2010, the disclosure of which is incorporated herein in its entirety by reference.

BACKGROUND

1. Field of the Invention

Apparatuses consistent with the exemplary embodiments relate to an encoder for measuring displacement of a moving object, and more particularly, to an optical encoder including a light-emitting unit and a light-receiving unit.

2. Description of the Related Art

An encoder is an electro-mechanical device that converts displacement of a moving part into an analog or digital signal. The encoder is mainly installed at a rotating shaft and is used to measure a rotation angle or speed of the rotating shaft.

Encoders are largely classified into incremental encoders and absolute encoders.

An incremental encoder includes a light-emitting unit, a disc including a track having slits arranged at a regular interval, and a light-receiving unit for detecting light transmitted through the slits. The incremental encoder measures a rotation angle or speed of the disc by counting pulse signals obtained by the light-receiving unit.

However, if a power supply of the incremental encoder is cut off, the rotation angle of the disc cannot be immediately checked even when power is reintroduced to the incremental encoder. In this case, in order to check the rotation angle of the disc, the disc should be rotated until a reference slit formed in the disc is detected by the light-receiving unit.

An absolute encoder includes a light-emitting unit, a disc including a plurality of tracks each having slits arranged to form a circle, and a light-receiving unit for detecting light transmitted through the slits. The slits that constitute one track have a same width, and the slits that constitute a different track have a different width. A plurality of light-receiving units are provided so that each of the plurality of light-receiving units can respectively corresponds to each of the tracks and can detect whether light emitted by the light-emitting unit passes through the slits of each track. The absolute encoder calculates the rotation angle of the disc from information obtained by the plurality of light-receiving units.

Even if a power supply of the absolute encoder is cut off, the rotation angle of the disc can be immediately checked once power is reintroduced to the absolute encoder. However, since the disc of the absolute encoder should include a plurality of tracks disposed in the form of concentric circles, there is a difficulty in reducing the size of the disc. Thus, there is a difficulty in making a small-sized absolute encoder. Also, since a plurality of light-receiving units should be disposed in each of the tracks, manufacturing costs of absolute encoders increase.

SUMMARY

One or more exemplary embodiments provides an encoder that may determine the position of a moving part even when a power supply of the encoder is cut off, and then, power is reintroduced to the encoder and that may be easily manufactured with a small size and low costs.

According to an aspect of an exemplary embodiment, there is provided an encoder including: a light-emitting unit a light-emitting unit which emits light; a moving part which moves relative to the light-emitting unit; a first pattern track which includes a plurality of first unit patterns sequentially formed on the moving part, separated from one another and having different widths; a first light-receiving unit which is disposed to correspond to the light-emitting unit and detects first information light received from the light-emitting unit via a first pattern of the first unit patterns; at least one second light-receiving unit which is disposed to correspond to the light-emitting unit and detects second information about light received from the light-emitting unit via at least one second pattern of the first unit patterns; and a displacement calculating unit which calculates a relative displacement of the moving part with respect to a reference position based on the first and second information.

BRIEF DESCRIPTION OF THE DRAWINGS

The above and other aspects will become more apparent by describing in detail exemplary embodiments thereof with reference to the attached drawings, in which.

DETAILED DESCRIPTION OF EXEMPLARY EMBODIMENTS

Hereinafter, exemplary embodiments will be described in detail with reference to the attached drawings.

Figure 1:
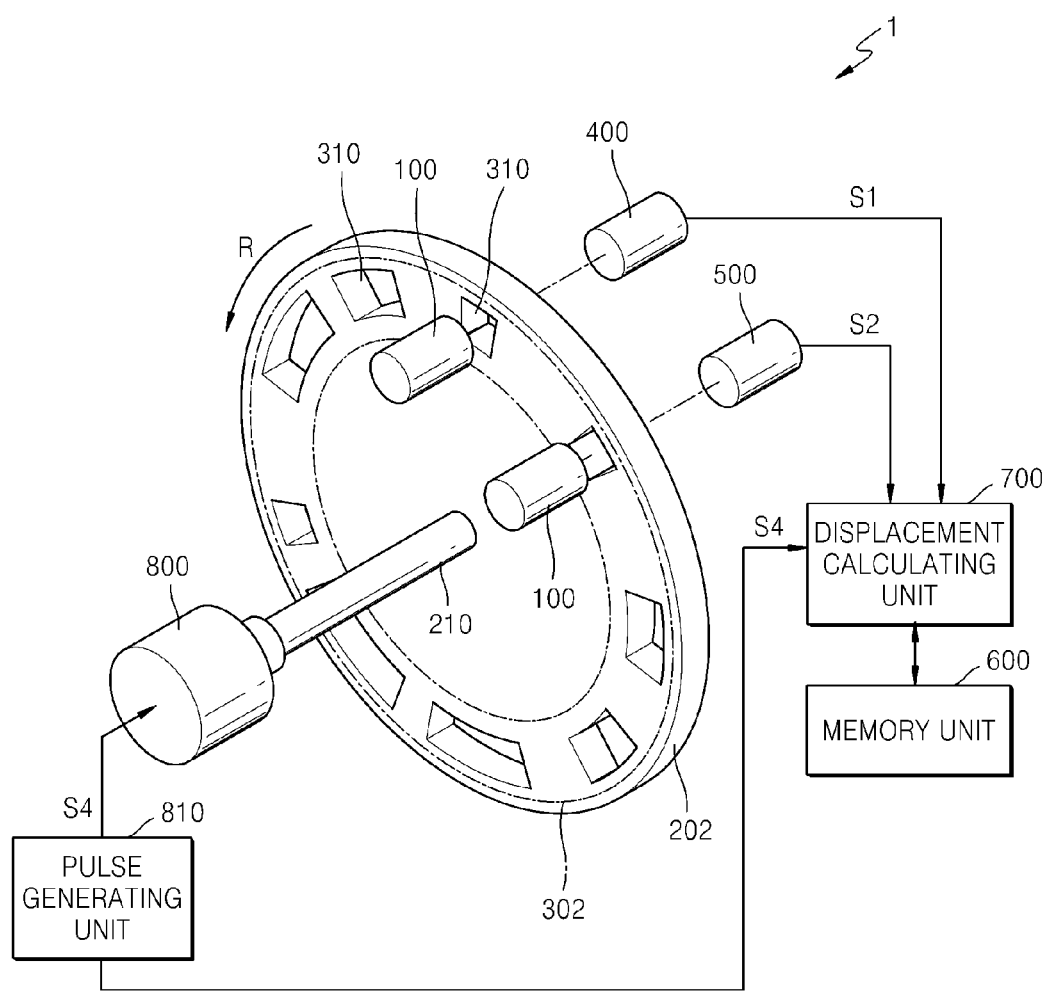
FIG. 1 is a schematic perspective view of an encoder according to an exemplary embodiment.
Figure 2:
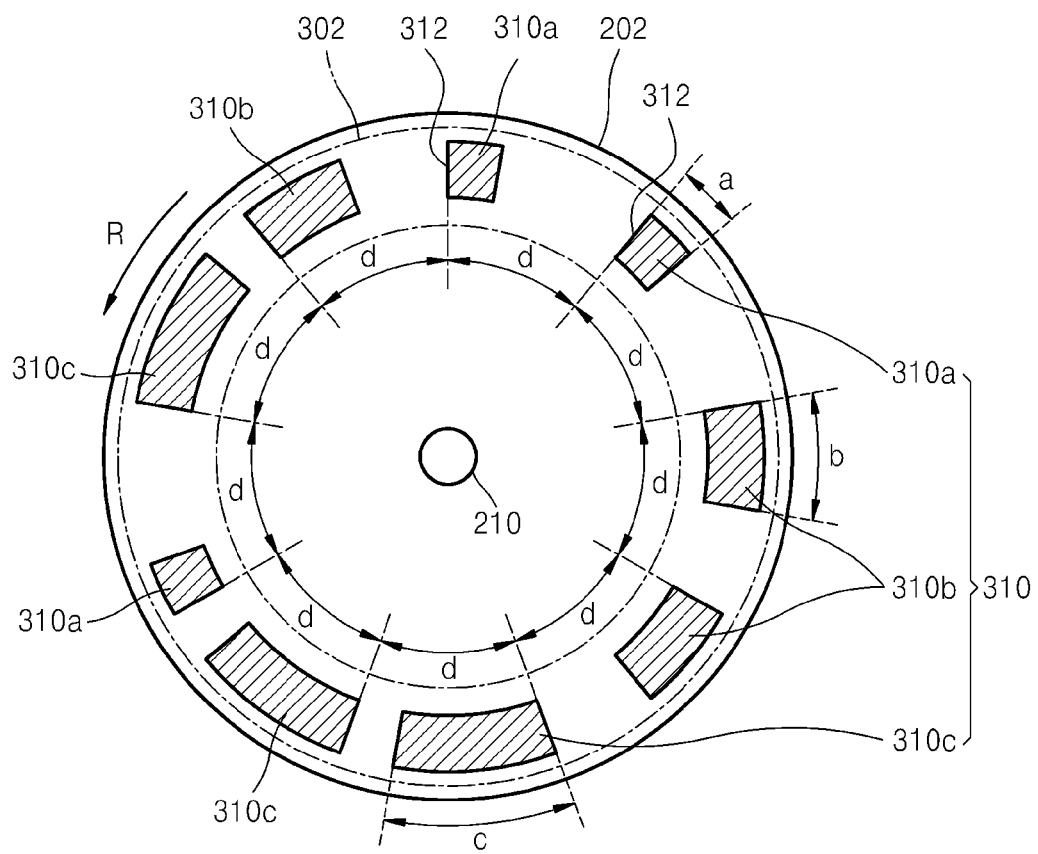
FIG. 2 schematically shows a moving part of the encoder of FIG. 1, according to an exemplary embodiment.
Figure 3:
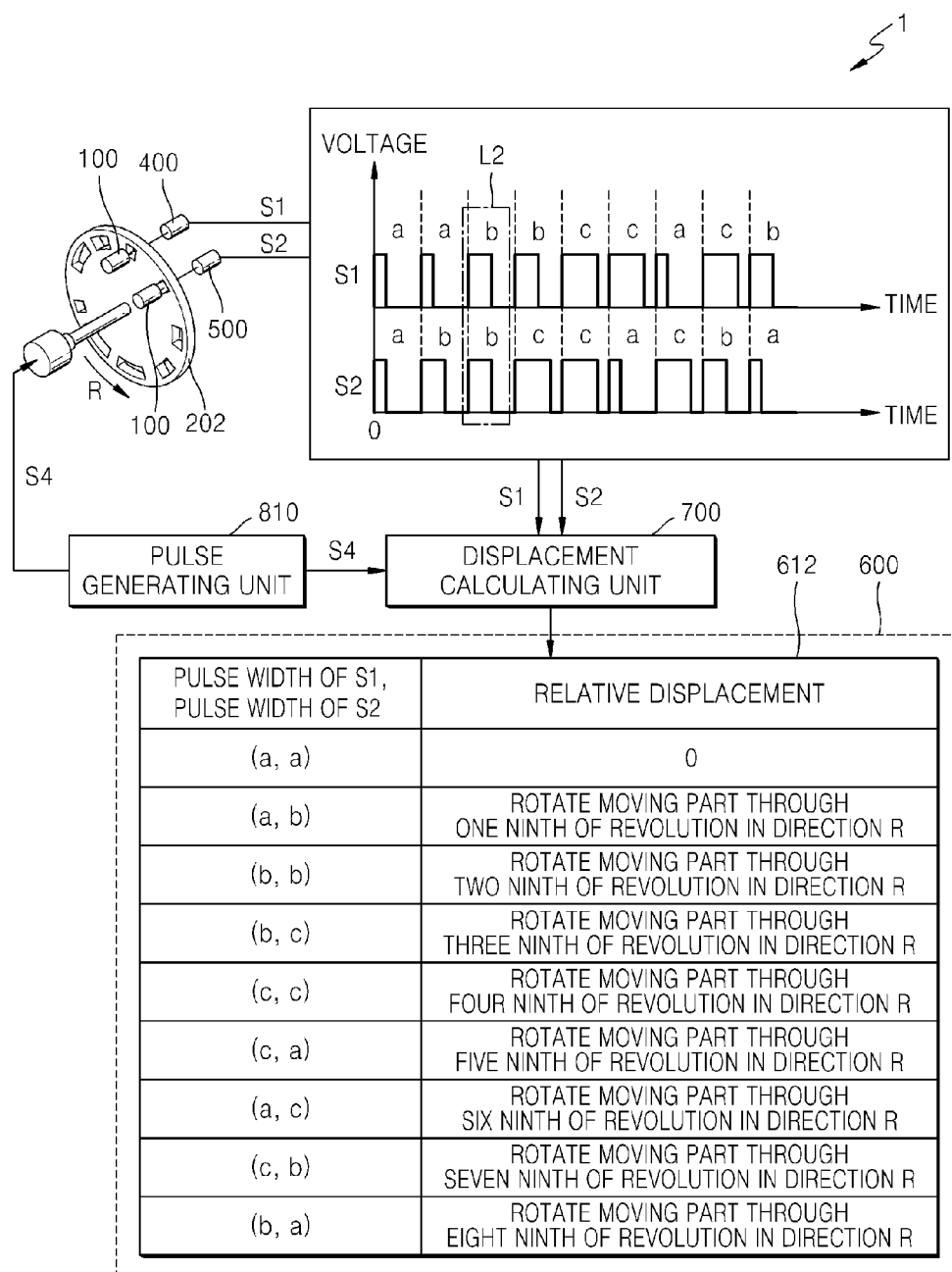
FIG. 3 illustrates an operation of determining displacement of the moving part by using the encoder of FIG. 1, according to an exemplary embodiment.

FIG. 1 is a schematic perspective view of an encoder 1 according to an exemplary embodiment, FIG. 2 schematically shows a moving part of the encoder 1 of FIG. 1, and FIG. 3 illustrates an operation of measuring determining displacement of the moving part by using the encoder 1 of FIG. 1.

Referring to FIGS. 1 through 3, the encoder 1 according to the current exemplary embodiment includes a light-emitting unit 100, a moving part 202, a first pattern track 302, a first light-receiving unit 400, a second light-receiving unit 500, a memory unit 600, a displacement calculating unit 700, a step motor 800, and a pulse generating unit 810.

The light-emitting unit 100 includes a light-emitting diode or laser that emits light in one direction. In the present exemplary embodiment, a plurality of light-emitting units 100 are provided.

The moving part 202 is disposed to be movable relative to the light-emitting units 100. In the present exemplary embodiment, the moving part 202 is disc-shaped and is fixedly installed to a rotating shaft 210. Thus, the moving part 202 is disposed to be rotatable around its rotation central axial line together with the rotating shaft 210. The rotation central axial line is fixed relative to the light-emitting units 100.

The first pattern track 302 is disposed on the moving part 202 along the rotating shaft 210 and includes first unit patterns 310. As illustrated in FIG. 2, a plurality of first unit patterns 310 include a plurality of slits 310a, 310b and 310c each having a different width and through which light from the light-emitting units 100 may pass, and the plurality of slits 310a, 310b and 310c of the first unit patterns 310 are arranged to form a circle at a predetermined interval in a predetermined order. In the present exemplary embodiment, the first unit patterns 310 include the three types of slits 310a, 310b and 310c having different widths, and each of the slits 310a, 310b and 310c extends in a direction in which they are arranged to have a different width, i.e., a direction parallel to a rotation direction R of the moving part 202 to have a different width. Leading end portions 312 of the slits 310a, 310b and 310c, in the rotation direction R, are disposed to be separated from one another by a predetermined distance d. In detail, while a distance between the slits 310a and 310b and a distance between the slits 310b and 310c may be different from each other, distances between the leading end portions 312 of the slits 310a, 310b and 310c in the direction parallel to the direction in which the slits 310a, 310b, and 310c are arranged are identical. Hereinafter, for convenience of explanation, the widths of the slits 310a, 310b and 310c will be referred to a, b and c, respectively.

The slits 310a, 310b and 310c are arranged to have widths in the order of a→a→b→b→c→c→a→c→b from a slit at a given position, e.g., an uppermost end position, of the moving part 202 in an opposite direction to the rotation direction R of the moving part 200, as illustrated in FIG. 2.

The first light-receiving unit 400 receives light emitted by the light-emitting units 100 and converts the light into a first signal S1, that is, an electrical signal. The first light-receiving unit 400 is disposed to be fixed relative to the light-emitting units 100 to correspond to the light-emitting units 100, wherein the moving part 202 is interposed between the light-emitting units 100 and the first light-receiving unit 400. The first light-receiving unit 400 detects the width of the unit patterns 310 in the first pattern track 302 by detecting light that passes through one of the slits 310a, 310b and 310c. Since light emitted by the light-emitting units 100 passes through the slits 310a, 310b, and 310c intermittently, the first signal S1 obtained by the first light-receiving unit 400 includes a plurality of pulses. Since a width of a pulse of the first signal S1 is proportional to a width of a slit through which light emitted by the light-emitting units 100 passes, information about the widths of the slits 310a, 310b and 310c may be obtained from the first signal S1. For example, assuming that the moving part 202 is rotated at a predetermined speed and for convenience of explanation, a proportional coefficient of the widths of the slits 310a, 310b and 310c with respect to the widths of the pulses of the first signal S1 is 1, the pulses of the first signal S1 obtained by the first light-receiving unit 400 are arranged to have corresponding widths in the order of a→a→b→b→c→c→a→c→b.

The second light-receiving unit 500 receives light emitted by the light-emitting units 100 and converts the light into a second signal S2, that is, an electrical signal. The second light-receiving unit 500 is disposed to correspond to the light-emitting units 100. The second light-receiving unit 500 is fixed relative to the light-emitting units 100, wherein the moving part 202 is interposed between the light-emitting units 100 and the second light-receiving unit 500. In the current exemplary embodiment, the first light-receiving unit 400 and the second light-receiving unit 500 are configured to receive light emitted from two different light-emitting units 100. According to another exemplary embodiment, however, the first light-receiving unit 400 and the second light-receiving unit 500 may be configured to receive light emitted from one light-emitting unit 100. As illustrated in FIG. 1, the second light-receiving unit 500 is disposed in a different position from the position of the first light-receiving unit 400 so as to detect other slits from among the slits 310a, 310b and 310c which are not the slits among the slits 310a, 310b and 310c detected by the first light-receiving unit 400. In the present exemplary embodiment, the second light-receiving unit 500 is disposed next to the first light-receiving unit 400. The second light-receiving unit 500 may also obtain information about the widths of the slits 310a, 310b and 310c. Since the second light-receiving unit 500 is disposed to detect slits that are adjacent to the slits 310a, 310b and 310c detected by the first light-receiving unit 400, the first signal S1 obtained by the first light-receiving unit 400 and the second signal S2 obtained by the second light-receiving unit 500 have a phase difference corresponding to one of the slits 310a, 310b and 310c. In detail, assuming that the moving part 202 is rotated at a predetermined speed and a proportional coefficient of the widths of the slits 310a, 310b and 310c with respect to the widths of the pulses of the second signal S2 is 1, the pulses of the second signal S2 obtained by the second light-receiving unit 500 are arranged to have corresponding widths in the order of a→b→b→c→c→a→c→b→a.

By using the first signal S1 and the second signal S2, ordered pairs of the widths of the slits 310a, 310b and 310c detected by the first light-receiving unit 400 and the widths of the slits 310a, 310b, and 310c detected by the second light-receiving unit 500 may be obtained. The first unit patterns 310 of the first pattern track 302 may include the slits 310a, 310b and 310c arranged in such a predetermined order that an ordered pair detected by the first and second light-receiving units 400 and 500 changes as the moving part 202 is rotated. For example, when the first pattern track 302 is formed in the form of the present exemplary embodiment, the ordered pairs obtained according to the first signal S1 and the second signal S2 vary in the order of (a, a)→(a, b)→(b, b)→(b, c)→(c, c)→(c, a)→(a, c)→(c, b)→(b, a). Since the ordered pairs obtained according to the first signal S1 and the second signal S2 vary according to a rotation displacement of the moving part 202, the position of the moving part 202 may be reversely determined from the ordered pairs.

In the present exemplary embodiment, the first light-receiving unit 400 and the second light-receiving unit 500 are disposed to detect two adjacent slits among the slits 310a, 310b, and 310c. Alternatively, the first light-receiving unit 400 and the second light-receiving unit 500 may be disposed to be separated from each other so as to detect two non-adjacent slits among the slits 310a, 310b and 310c. In this case, the first signal S1 and the second signal S2 have a phase difference corresponding to the number of slits 310a, 310b and 310c disposed between the first light-receiving unit 400 and the second light-receiving unit 500.

Also, in the present exemplary embodiment, there may be one second light-receiving unit 500. Alternatively, a plurality of second light-receiving units 500 may be provided. In other words, there may be more than two light-receiving units, according to an exemplary embodiment. In this regard, the first unit patterns 310 may be arranged in such a predetermined order that the ordered pairs of the widths of the slits 310*a*, 310*b* and 310*c* simultaneously detected by the first light-receiving unit 400 and the plurality of second light-receiving units 500 vary as the moving part 202 is rotated.

A mapping table 612 is stored in the memory unit 600. According to an exemplary embodiment, the mapping table 612 may include a correspondence relationship between information about the widths of the first unit patterns 310 obtained by using the pulses of the first signal S1 of the first light-receiving unit 400 and the pulses of the second signal S2 of the second light-receiving unit 500 and a relative displacement of the moving part 202 with respect to a position of the light-receiving units 100 or a reference position. According to an exemplary embodiment, the mapping table 612 may include information in which ordered pairs of the pulse widths of the first signal S1 and the pulse widths of the second signal S2 correspond to a relative displacement of the moving part 202 with respect to the light-receiving units 100. The memory unit 600 may be a non-volatile memory so that information about the mapping table 612 may be kept even when power is not supplied to the memory unit 600.

The above-described relationship will be shown in Table 1 below. In Table 1, the relationship will be described based on a reference position corresponding to a case where an ordered pair including the widths of the slits 310*a*, 310*b* and 310*c* detected by the first light-receiving unit 400 and detected by the second light-receiving unit 500 is (a, a).

TABLE 1

| (Width of Slit Detected by First Light-Receiving Unit 400, Width of Slit Detected by Second Light-Receiving Unit 500) | Relative Displacement of Moving part 202 |
|---|---|
| (a, a) | 0 |
| (a, b) | moving part 202 rotated one ninth of a revolution in rotation direction R of moving part |
| (b, b) | moving part 202 rotated two ninths of a revolution in rotation direction R of moving part |
| (b, c) | moving part 202 rotated three ninths of a revolution in rotation direction R of moving part |
| (c, c) | moving part 202 rotated four ninths of a revolution in rotation direction R of moving part |
| (c, a) | moving part 202 rotated five ninths of a revolution in rotation direction R of moving part |
| (a, c) | moving part 202 rotated six ninths of a revolution in rotation direction R of moving part |
| (c, b) | moving part 202 rotated seven ninths of a revolution in rotation direction R of moving part |
| (b, a) | Rotate moving part 202 rotated eight ninths of a revolution in rotation direction R of moving part |

In the above table, the widths of the slits 310*a*, 310*b* and 310*c* detected by the first light-receiving unit 400 and the second light-receiving unit are paired. As shown in the table 612 of FIG. 3, however, the pulse widths of the first signal S1 and the second signal S2 detected by the first light-receiving unit 400 and the second light-receiving unit may also be paired to determine a corresponding relative displacement of the moving part 202 with respect to the light-receiving units 100. Since the mapping table 612 includes the correspondence relationship between the ordered pairs of the pulse widths of the first signal S1 and the pulse widths of the second signal S2, and the relative displacements of the moving part 202, the relative displacement of the moving part 202 may be determined by referring to the mapping table 612. For example, when the pulses of the first signal S1 and the second signal S2 located in a position L2, as indicated by a dot dash line of FIG. 3, are input to the displacement calculating unit 700, the displacement calculating unit 700 may recognize immediately that the moving part 202 is located in a position where the moving part 202 has rotated through two ninths of a revolution in the rotation direction R from the ordered pair (b, b) of the pulse widths of the first signal S1 and the second signal S2 by referring to the mapping table 612.

The displacement calculating unit 700 receives the first signal S1 obtained by the first light-receiving unit 400 and the second signal S2 obtained by the second light-receiving unit 500, and calculates the displacement of the moving part 202 by referring to the mapping table 612.

The step motor 800 includes a driving shaft fixedly connected to the rotating shaft 210 of the moving part 202, and rotates the moving part 202. The driving shaft of the step motor 800 is rotated by a predetermined angle when a pulse of a pulse signal is input to the step motor 800. Thus, the rotation speed of the driving shaft of the step motor 800 is increased in proportion to the number of pulses applied to the step motor 800 per unit time.

The pulse generating unit 810 generates a driving pulse signal S4 including pulses for driving the step motor 800, and inputs the driving pulse signal S4 to the step motor 800 and the displacement calculating unit 700. By using the driving pulse signal S4, the widths of the slits 310*a*, 310*b* and 310*c* detected by the first light-receiving unit 400 and the second light-receiving unit 500 may be determined from the first signal S1 and the second signal S2 even when the rotation speed of the moving part 202 changes. This is because the rotation speed of the moving part 202 is proportional to the number of pulses of the driving pulse signal S4 applied to the step motor 800, and thus, may be determined from the number of the pulses of the driving pulse signal S4 applied to the step motor 800 by the displacement calculating unit 700, and the widths of the slits 310*a*, 310*b* and 310*c* detected by the first light-receiving unit 400 and the second light-receiving unit 500 may be calculated from the first signal S1 and the second signal S2 by using the rotation speed of the moving part 202 at the displacement calculating unit 700. The widths of the slits 310*a*, 310*b* and 310*c* detected by the first light-receiving unit 400 and the second light-receiving unit 500 may be calculated by multiplying the pulse widths of the first signal S1 and the second signal S2 by the moving speed of the slits 310*a*, 310*b* and 310*c*.

In the present exemplary embodiment, the first unit patterns 310 include the three types of slits 310*a*, 310*b* and 310*c*. Alternatively, the first unit patterns 310 may include more than three types of slits. If the number of types of slits of the first unit patterns 310 is n, then the number of ordered pairs of the first unit patterns 310 detected by the first light-receiving unit 400 and the second light-receiving unit 500 is $n^2$. Thus, the precision of measurement can be remarkably improved by increasing the number of types of slits of the first unit patterns 310 and by properly arranging the slits.

Also, when the number of second light-receiving units 500 increases up to p, the number of ordered pairs of the first unit patterns 310 detected by the first light-receiving unit 400 and the second light-receiving units 500 is $n^{p+1}$. Thus, the precision of measurement can be remarkably improved by increasing the number of second light-receiving units 500.

Also, in order to have greater precision of measurement, a difference between widths of different types of slits of the first unit patterns 310 may be minimized. In detail, different types of first unit patterns 310 with a minimum difference between their widths that can be recognized by the first light-receiving unit 400 and the second light-receiving unit 500 may be provided. For example, when the first light-receiving unit 400 and the second light-receiving unit 500 can distinguish between slits having a difference in width of 1 mm, the first unit patterns 310 may include slits having widths of 3 mm, 4 mm, 5 mm and 6 mm. In this way, the widths of the first unit patterns 310 are minimized so that more first unit patterns 310 can be arranged on the first pattern track 302 and precision of measurement of the rotation speed of the moving part 202 can be further improved.

Since the encoder 1 of FIG. 1 may immediately measure the displacement of the moving part 202 once the first light-receiving unit 400 and the second light-receiving unit 500 detect the widths of the first unit patterns 310, even when a power supply of the encoder 1 is cut off and then power is reintroduced to the encoder 1, the displacement of the moving part 202 may be immediately determined. Thus, the encoder 1 of FIG. 1 may function as an absolute encoder.

Also, a related art absolute encoder includes a plurality of unit patterns arranged in the form of concentric circles, whereas the encoder 1 of FIG. 1 has only to include the first unit patterns 310 arranged to form a single circle. Thus, the encoder 1 of FIG. 1 has a simple structure and may be small-sized. Also, the encoder 1 of FIG. 1 may include a smaller number of light-emitting units and light-receiving units than those of the related art absolute encoder, and thus, may be manufactured with lower costs.

Next, an encoder according to another exemplary embodiment will be described with reference to the attached drawings.

Figure 4:
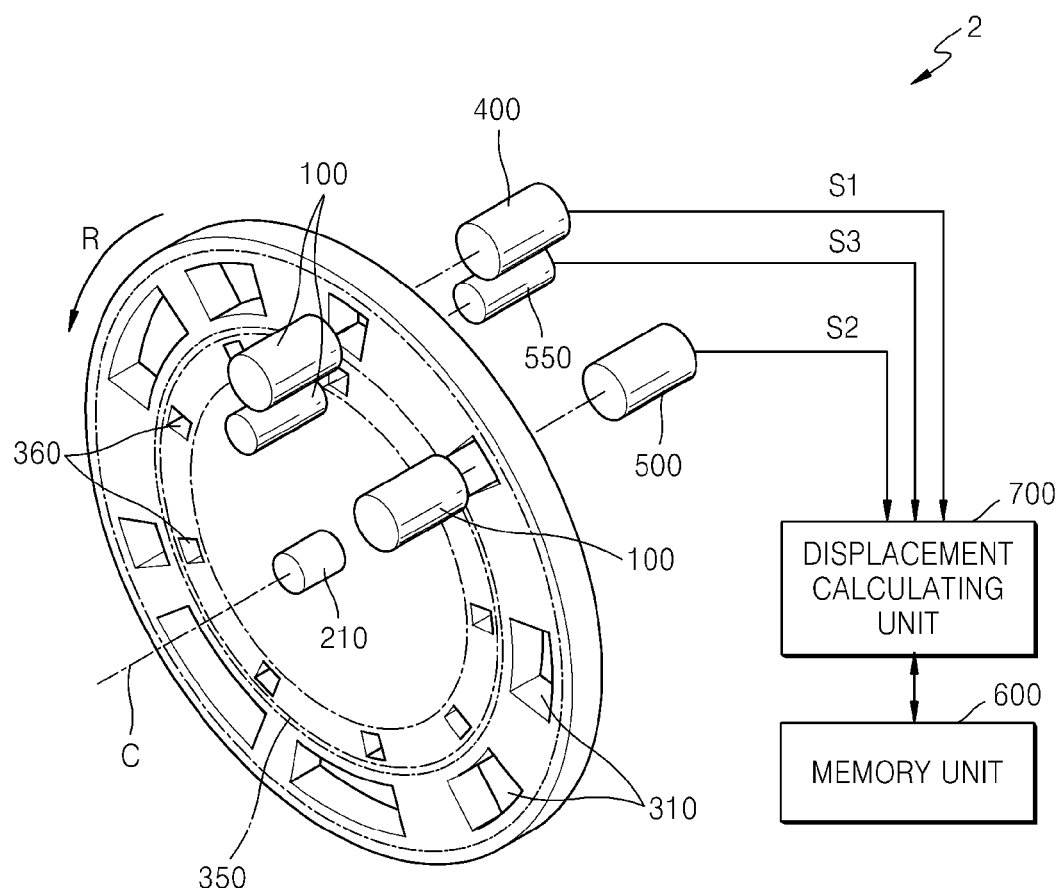
FIG. 4 is a schematic perspective view of an encoder according to another exemplary embodiment.
Figure 5:
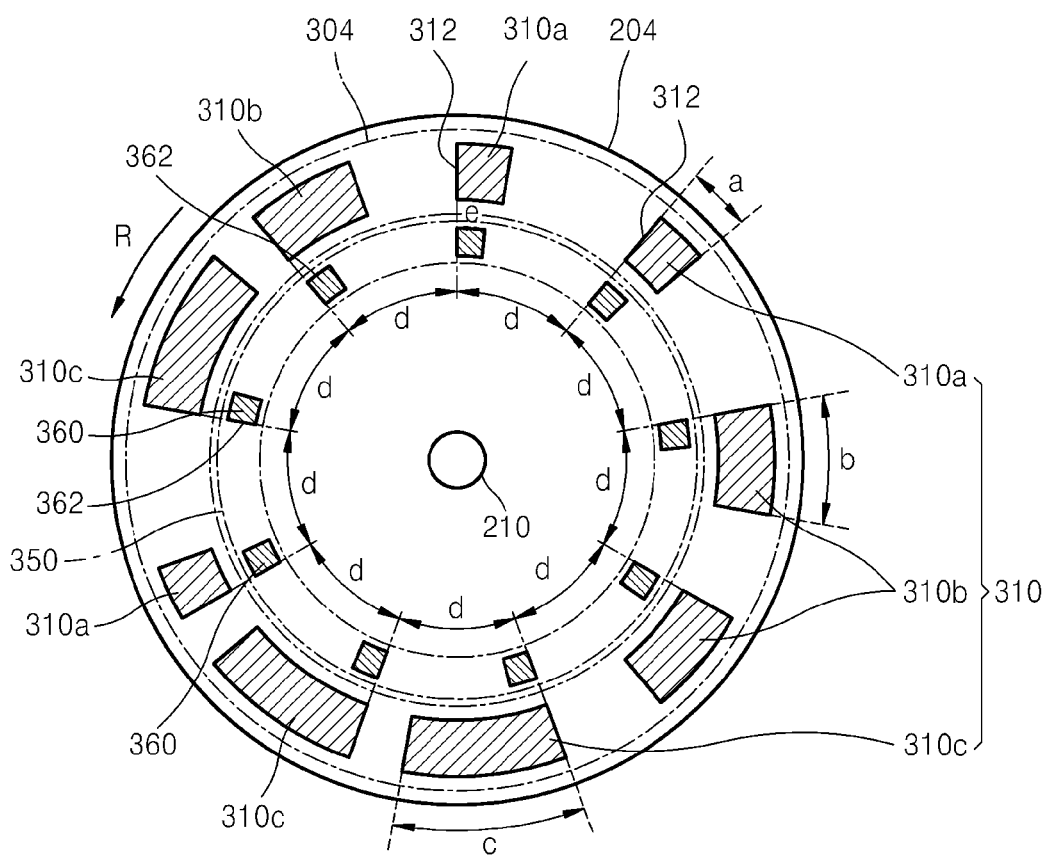
FIG. 5 schematically shows a moving part of the encoder of FIG. 4, according to an exemplary embodiment.
Figure 6:
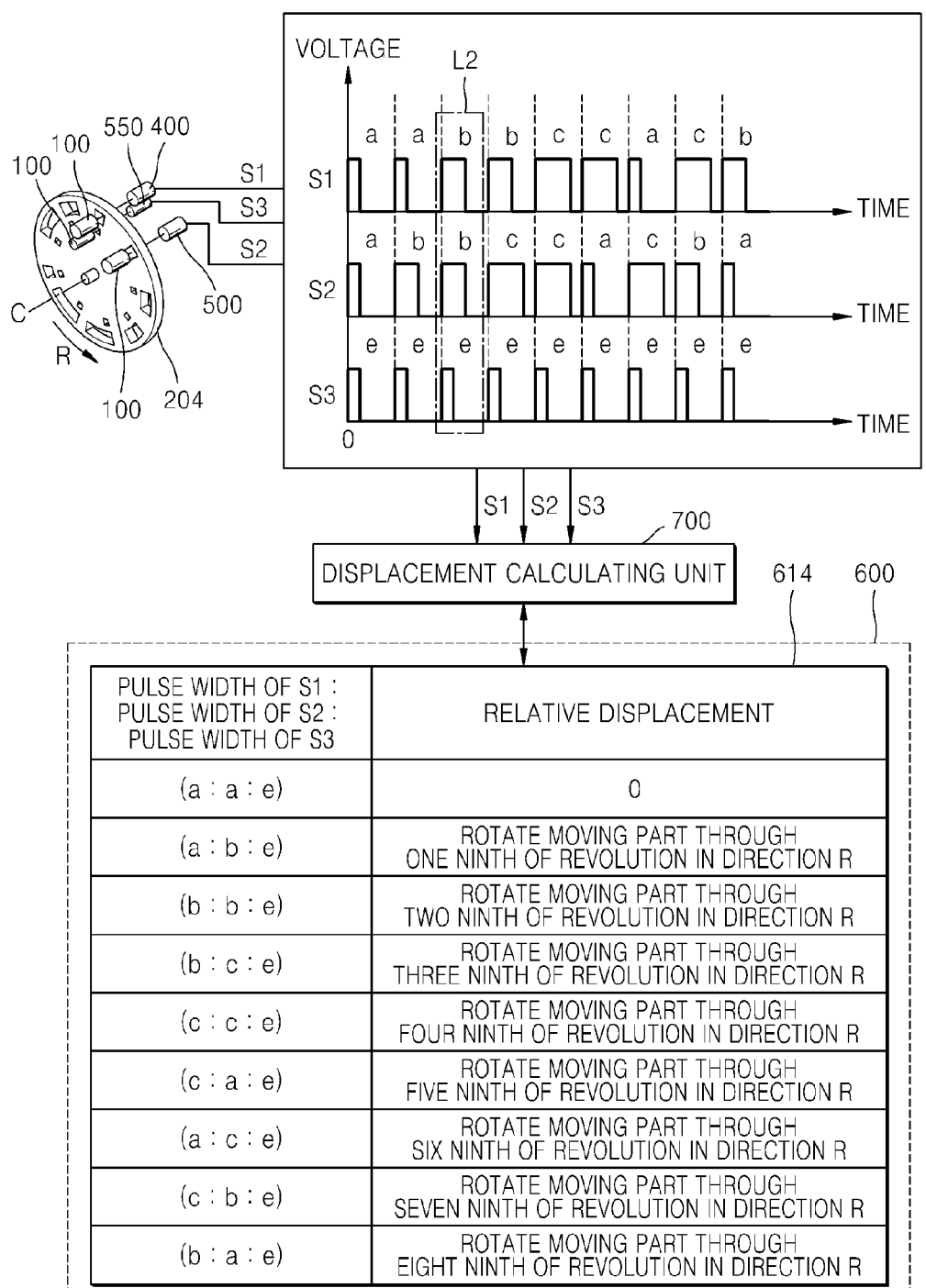
FIG. 6 illustrates an operation of determining displacement of the moving part by using the encoder of FIG. 4, according to an exemplary embodiment.

FIG. 4 is a schematic perspective view of an encoder 2 according to another exemplary embodiment, FIG. 5 schematically shows a moving part of the encoder 2 of FIG. 4, and FIG. 6 illustrates an operation of measuring displacement of the moving part by using the encoder 2 of FIG. 4.

Referring to FIGS. 4 through 6, the encoder 2 according to the current exemplary embodiment includes a light-emitting unit 100, a moving part 204, a first pattern track 304, a first light-receiving unit 400, a second light-receiving unit 500, a memory unit 600, a displacement calculating unit 700, a second pattern track 350, and a third light-receiving unit 550. The light-emitting unit 100, the moving part 204, the first pattern track 304, the first light-receiving unit 400, the second light-receiving unit 500, the memory unit 600, and the displacement calculating unit 700 of the encoder 2 according to the current exemplary embodiment are substantially the same as those of the encoder 1 of FIG. 1, and thus, a detailed description thereof will not be provided here.

The second pattern track 350 is disposed concentric to the first pattern track 304 so as to form a concentric circle with the first pattern track 304, and includes a plurality of second unit patterns 360 having predetermined widths. In the present exemplary embodiment, the second unit patterns 360 include slits having the same width. The slits of the second unit patterns 360 are formed to extend in a direction in which the second unit patterns 360 are arranged and to have predetermined widths, as illustrated in FIG. 5. The second unit patterns 360 are disposed to have leading end portions 362, in the rotation direction R, separated from one another by a predetermined distance. In detail, each of the second unit patterns 360 has the same width, and are spaced apart from each other the same distance. Hereinafter, the widths of the slits that constitute the second unit patterns 360 are referred to as e.

When the moving part 204 is rotated in one rotation direction R, a first signal S1 obtained by the first light-receiving unit 400, a second signal S2 obtained by the second light-receiving unit 500, and a third signal S3 obtained by the third light-receiving unit 550 are input to the displacement calculating unit 700. The first signal S1, the second signal S2, and the third signal S3, which are generated as the moving part 204 is rotated, have a form as shown in FIG. 6.

When the rotating speed of the moving part 204 is changed, pulse widths of the first signal S1, the second signal S2, and the third signal S3 are increased or reduced at the same ratio. The pulse widths of the first signal S1 and the pulse widths of the second signal S2 are normalized to a time domain based on the third signal S3, and thus, are normalized so that the widths of the first unit patterns 310 can be accurately calculated even when the rotating speed of the moving part 204 is changed. In detail, when time bases of the first signal S1, the second signal S2, and the third signal S3 are normalized so as to make the pulse widths of the third signal S3 uniform, information about the widths of the first unit patterns 310 may be calculated even when the rotating speed of the moving part 204 is changed.

As a way to normalize the first signal S1 and the second signal S2 in the time domain based on the third signal S3, the pulse widths of the first signal S1 and the pulse widths of the second signal S2 may be divided by the pulse widths of the third signal S3 at the displacement calculating unit 700. Alternatively, the ratios of the first signal S1 and the second signal S2 with respect to the third signal S3 may be used by the displacement calculating unit 700.

In the present exemplary embodiment, the ratios of the first signal S1 and the second signal S2 with respect to the third signal S3 are used so that the first signal S1 and the second signal S2 can be normalized in the time domain based on the third signal S3. In detail, a mapping table 614 according to the current exemplary embodiment includes a correspondence relationship between the ratios of the pulse widths of the first signal S1, the pulse widths of the second signal S2, and the pulse widths of the third signal S3 and a relative moving displacement of the moving part 204, as illustrated in FIG. 6.

In this way, the first signal S1 and the second signal S2 are normalized based on the third signal S3 obtained by the second unit patterns 360 so that the widths of the first unit patterns 310 can be calculated regardless of the rotation speed of the moving part 204. Thus, even when the rotation speed of the moving part 204 is changed, the relative displacement of the moving part 204 to the light-emitting unit 100 may be calculated.

Next, an encoder according to another exemplary embodiment will be described with reference to the attached drawings.

Figure 7:
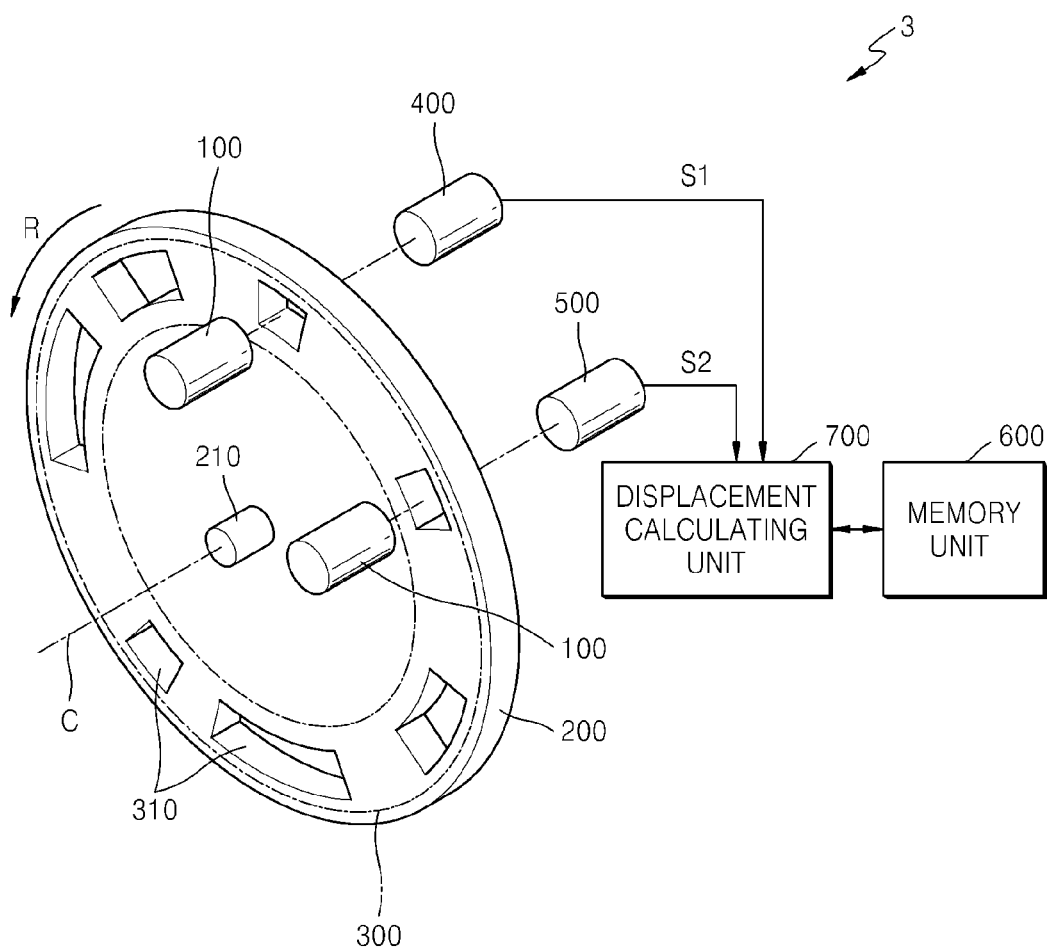
FIG. 7 is a schematic perspective view of an encoder according to another exemplary embodiment.
Figure 8:
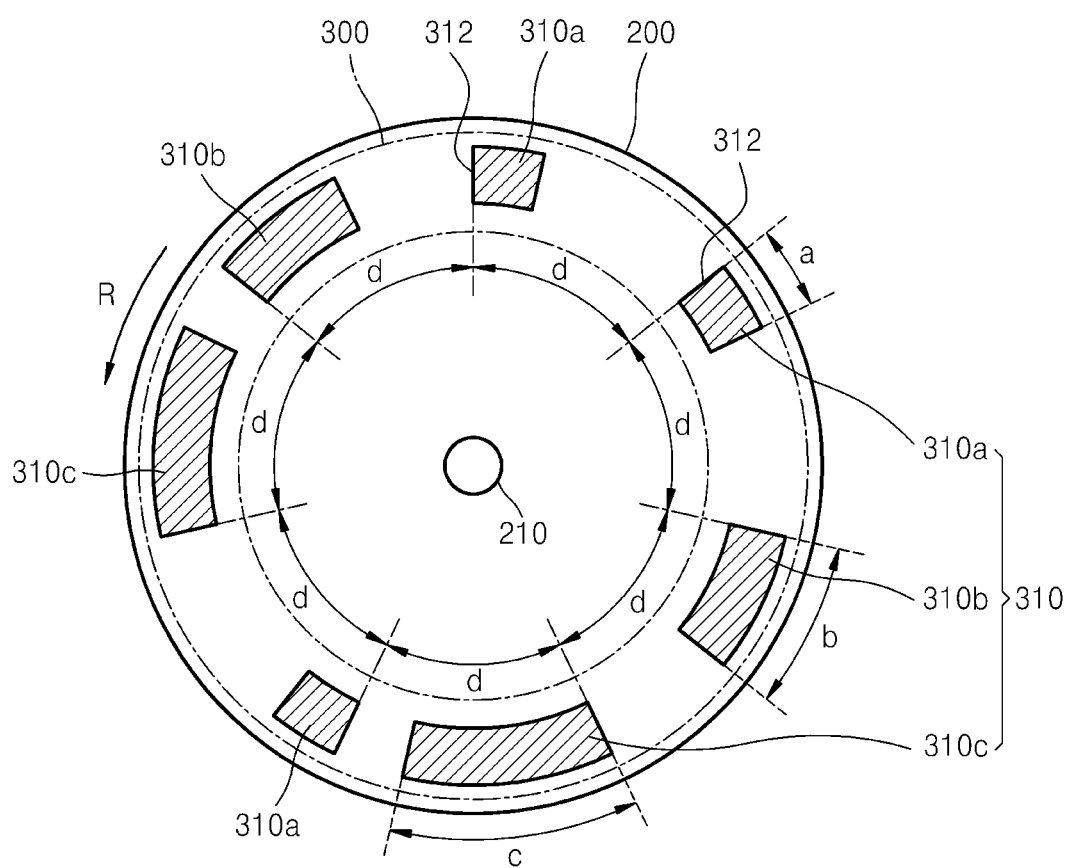
FIG. 8 schematically shows a moving part of the encoder of FIG. 7, according to an exemplary embodiment.
Figure 9:
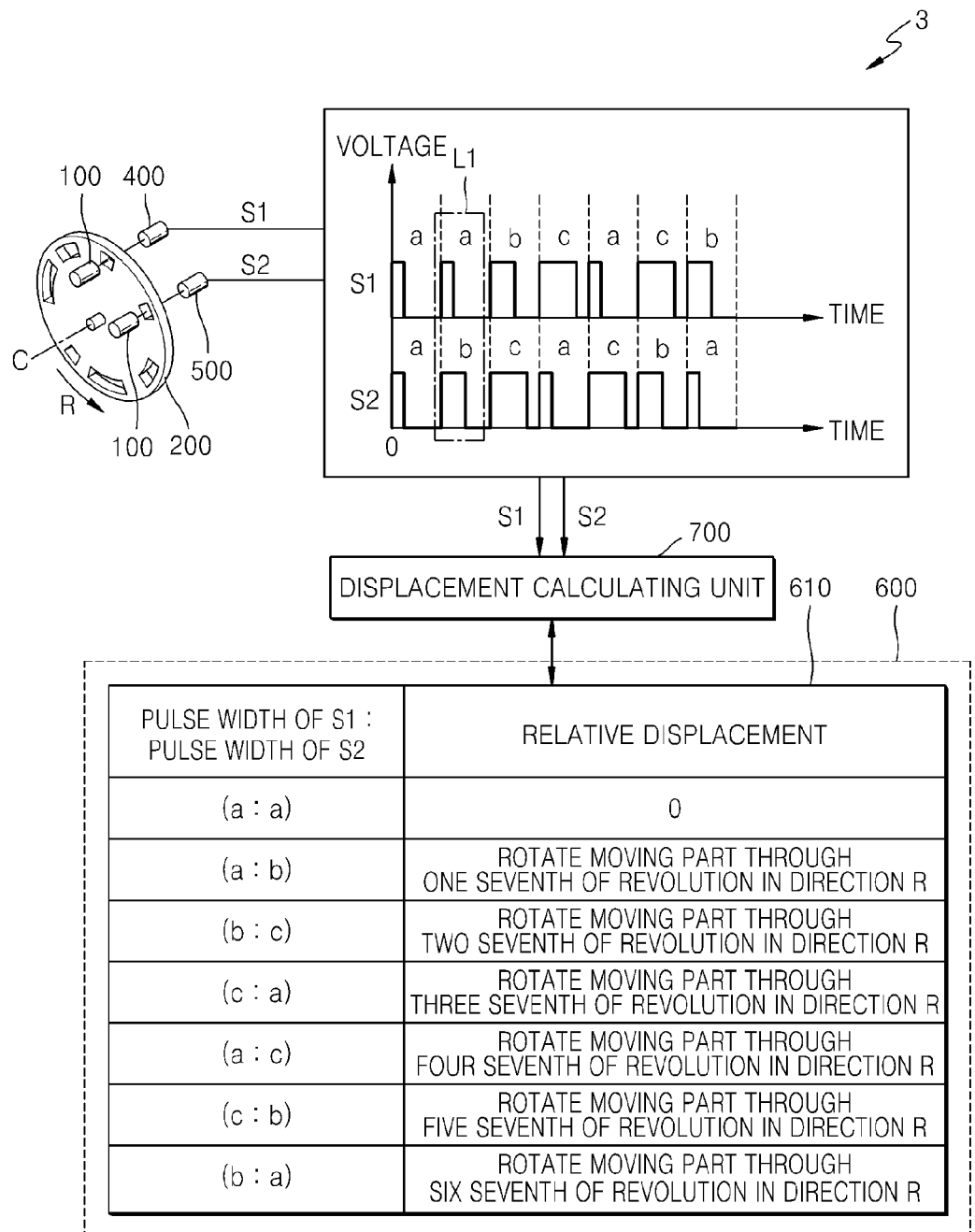
FIG. 9 illustrates an operation of determining displacement of the moving part by using the encoder of FIG. 7, according to an exemplary embodiment.

FIG. 7 is a schematic perspective view of an encoder 3 according to another exemplary embodiment, FIG. 8 schematically shows a moving part of the encoder 3 of FIG. 7, and FIG. 9 illustrates an operation of measuring displacement of the moving part by using the encoder 3 of FIG. 7.

Referring to FIGS. 7 through 9, the encoder 3 according to the current exemplary embodiment includes a light-emitting unit 100, a moving part 200, a first pattern track 300, a first light-receiving unit 400, a second light-receiving unit 500, a memory unit 600, and a displacement calculating unit 700. The light-emitting unit 100, the first light-receiving unit 400, and the second light-receiving unit 500 are the same as those of the encoder 3 of FIG. 7 and thus, a detailed description thereof will not be provided here.

The moving part 200 is disc-shaped and is fixedly installed to a rotating shaft 210. Thus, the moving part 200 is rotated around its rotation central axial line C together with the rotating shaft 210. The rotation central axial line C is fixed relative to the light-emitting unit 100.

first pattern track 300 is disposed on the moving part 200 along the rotation central axial line C. As illustrated in FIG. 8, a plurality of first unit patterns 310 include a plurality of slits 310a, 310b and 310c having different widths, and through which light from the light-emitting units 100 may pass. When the widths of the slits 310a, 310b and 310c of the first unit patterns 310 are a, b and c, the widths a b, and c satisfy the following relationships.

a≠b, b≠c, c≠a a:b≠b:c, b:c≠c:a, c:a≠a:b

In detail, the widths of the slits 310a, 310b and 310c are different from one another, and ratios of the widths between the different slits 310a, 310b and 310c are different from one another.

Leading end portions 312 of the first unit patterns 310, in the rotation direction R, are disposed to be separated from one another by a predetermined distance d. In detail, distances between the slits 310a, 310b and 310c of the first unit patterns 310 may be different from one another. However, distances between the leading end portions 312 of the first unit patterns 310 in the direction parallel to a radial direction of the circle in which the first unit patterns 310 are arranged are identical.

The slits 310a, 310b and 310c are arranged to have widths in the order of a→a→b→c→a→c→b from a slit formed at a reference position, e.g., an uppermost portion, of the moving part 200 in an opposite direction to the rotation direction R of the moving part 200, as illustrated in FIG. 8. Thus, assuming that the moving part 200 is rotated at a predetermined speed and for convenience of explanation, a proportional coefficient of the widths of the slits 310a, 310b and 310c with respect to the widths of the pulses of a first signal S1 is 1, the pulses of the first signal S1 obtained by the first light-receiving unit 400 are arranged to have corresponding widths in the order of a→a→b→c→a→c→b. Also, the pulses of a second signal S2 are arranged to have widths in the order of a→b→c→a→c→b→a.

Since the first unit patterns 310 are arranged in the above-described order, as the moving part 200 moves, ratios of the widths of the first unit patterns 310 simultaneously detected by the first light-receiving unit 400 and the second light-receiving unit 500 are in the order of a:a→a:b→b:c c:a→a: c→c:b→b:a. Also, since sizes of a, b and c and ratios thereof are different from one another, the ratios of the widths of the first unit patterns 310 simultaneously detected by the first light-receiving unit 400 and the second light-receiving unit 500 are different from one another. Although the slits 310a, 310b, and 310c of the first unit patterns 310 may be arranged in various orders, as the moving part 200 moves, the slits 310a, 310b and 310c of the first unit patterns 310 are arranged in a predetermined order such that the ratios of the widths of the first unit patterns 310 detected by the first light-receiving unit 400 with respect to the widths of the first unit patterns 310 simultaneously detected by the second light-receiving unit 500 are different from one another. Thus, rotation angles (or displacements) of the moving part 200 and ratios of the widths have a one-to-one correspondence so that a rotation angle (or a displacement) of the moving part 200 may be determined by detecting a ratio of the width of the first unit patterns 310 detected by the first light-receiving unit 400 with respect to a width of the first unit patterns 310 simultaneously detected by the second light-receiving unit 500.

A mapping table 610 stored in the memory unit 600 includes information in which the ratio of the pulse width of the first signal S1 with respect to the pulse width of the second signal S2 corresponds to a relative displacement of the moving part 200 with respect to a position of the light-emitting unit 100 or a reference position.

The above-described relationship will be shown in Table 2 below. In Table 2, the relationship will be described based on a reference position corresponding to a case where the ratio of the pulse width of the first signal S1 with respect to the pulse width of the second signal S2 is a:a.

TABLE 2

| Pulse Width of First Signal S1: Pulse Width of Second Signal S2 | Relative Displacement of Moving part 200 with respect to Light-emitting Unit 100 |
|---|---|
| a:a | 0 |
| a:b | Rotate moving part 200 through one seventh of revolution in rotation direction R of moving part 202 |
| b:c | Rotate moving part 200 through two seventh of revolution in rotation direction R of moving part 200 |
| c:a | Rotate moving part 200 through three seventh of revolution in rotation direction R of moving part 200 |
| a:c | Rotate moving part 200 through four seventh of revolution in rotation direction R of moving part 200 |
| c:b | Rotate moving part 200 through five seventh of revolution in rotation direction R of moving part 200 |
| b:a | Rotate moving part 200 through six seventh of revolution in rotation direction R of moving part 200 |

In detail, when the ratio of the pulse width of the first signal S1 with respect to the pulse width of the second signal S2 simultaneously measured is determined, the relative displacement of the moving part 200 with respect to the light-emitting unit 100 may be immediately determined by referring to the mapping table 610. For example, when the pulses of the first signal S1 and the pulses of the second signal S2, which are located in a position L1 indicated by a dot dash line shown in FIG. 9, are input to the displacement calculating unit 700, the displacement calculating unit 700 may recognize immediately that the moving part 200 is located in a position where the moving part 200 has rotated through one seventh of a revolution in the rotation direction R of the moving part 200, by reading the ratio of the pulse width of the first signal S1 with respect to the pulse width of the second signal S2, i.e., the displacement of the moving part 200 with respect to the position of the light-emitting unit 100 that corresponds to a:b.

The displacement calculating unit 700 receives the first signal S1 obtained by the first light-receiving unit 400 and the second signal S2 obtained by the second light-receiving unit 500, and calculates the displacement of the moving part 200 by referring to the mapping table 610.

By using the encoder 3 of FIG. 8, the rotation speed of the moving part 200 may be easily determined. In detail, the rotation speed of the moving part 200 may be easily determined by measuring the number of pulses of the first signal S1 or the second signal S2 per hour.

Also, the pulse widths of the first signal S1 and the pulse widths of the second signal S2 may vary according to the rotation speed of the moving part 200. However, since the pulse widths of the first signal S1 and the pulse widths of the second signal S2 are increased or reduced at the same rate, the ratio of the pulse widths of the first signal S1 with respect to the pulse widths of the second signal S2 is maintained constant. Thus, even when the rotation speed of the moving part 200 is changed, there is no problem in measuring the displacement of the moving part 200. An additional configuration is not necessary to check the rotation speed of the moving part 200.

Next, an encoder according to another exemplary embodiment will be described with reference to the attached drawings.

Figure 10:
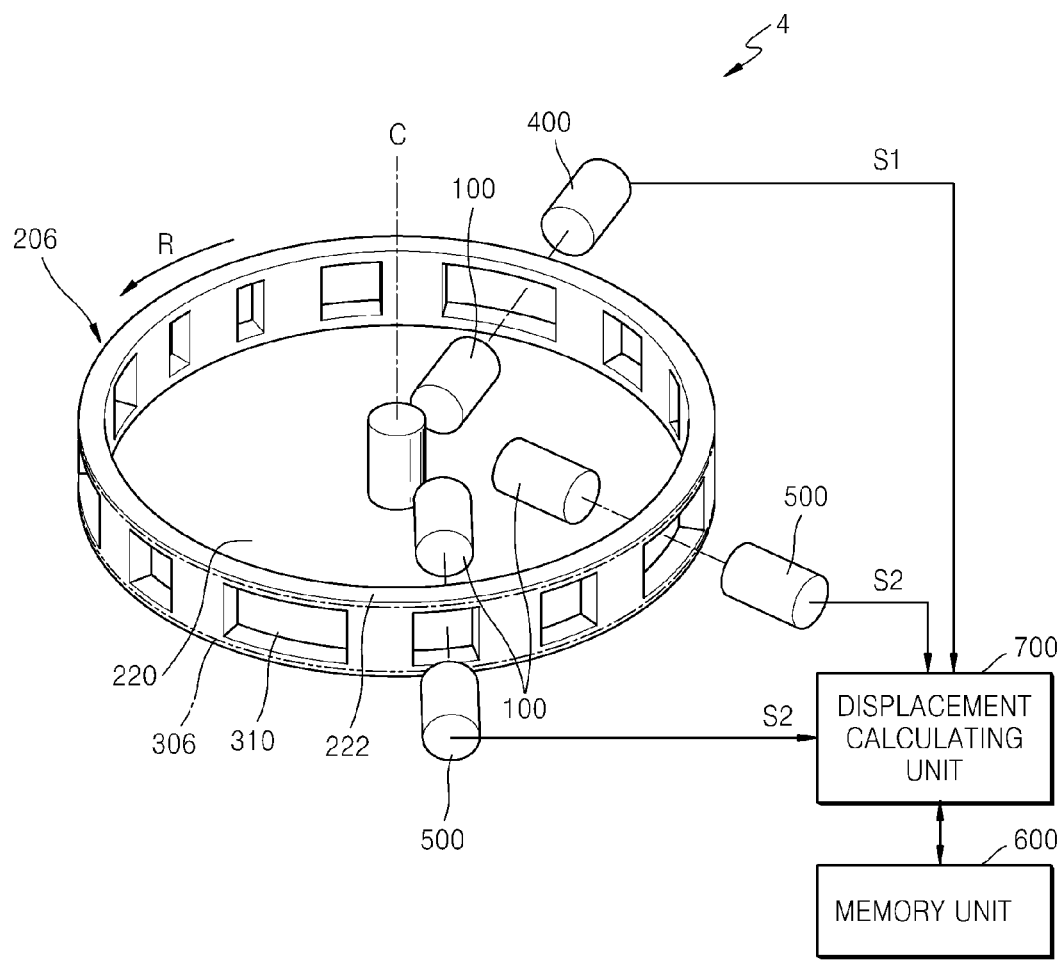
FIG. 10 is a schematic perspective view of an encoder according to another exemplary embodiment.

FIG. 10 is a schematic perspective view of an encoder 4 according to another exemplary embodiment. Referring to FIG. 10, the encoder 4 according to the current exemplary embodiment includes a light-emitting unit 100, a moving part 206, a first pattern track 306, a first light-receiving unit 400, a second light-receiving unit 500, a memory unit 600, and a displacement calculating unit 700, like in the encoder 1 of FIG. 1.

In the current exemplary embodiment, the moving part 206 includes a disc 220 and a wall portion 222.

The disc 220 is circular-shaped and is fixed to a rotating shaft 210 that is rotated around a rotation central axial line C fixed relative to the light-emitting unit 100 and is rotated together with the rotating shaft 210.

The wall portion 222 protrudes from edge portions of the disc 220 in a direction parallel to the rotation central axial line C and extends along the rotation central axial line C.

The first pattern track 306 is disposed on the wall portion 222 along the rotation central axial line C. A plurality of first unit patterns 310 of the first pattern track 306 include a plurality of slits having different widths.

The first pattern track 306 is interposed between the light-emitting unit 100 and the first light-receiving unit 400, and two second light-receiving units 500 are provided.

A mapping table stored in the memory unit 600 according to the current exemplary embodiment may include a correspondence relationship between a set of a first signal S1 obtained by the first light-receiving unit 400 and two second signals S2 obtained by the second light-receiving units 500 and displacement of the moving part 206.

In the encoder 4 of FIG. 10, the light-emitting units 100 are disposed to face the first light-receiving unit 400 and the second light-receiving units 500 in a direction perpendicular to the rotation central axial line C, and thus, the size of the encoder 4 in the direction perpendicular to the rotation central axial line C is efficiently reduced.

Next, an encoder according to another exemplary embodiment will be described with reference to the attached drawings.

Figure 11:
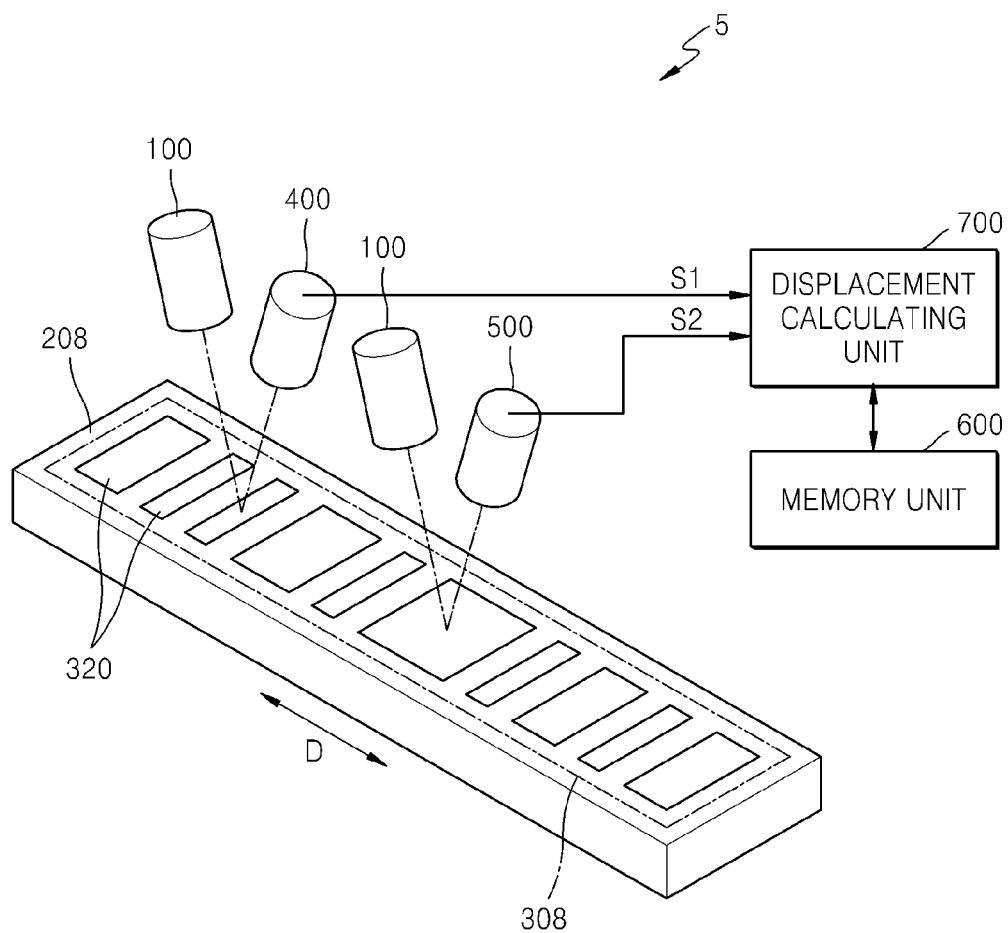
FIG. 11 is a schematic perspective view of an encoder according to another exemplary embodiment.

FIG. 11 is a schematic perspective view of an encoder 5 according to another exemplary embodiment. Referring to FIG. 11, the encoder 5 according to the current exemplary embodiment includes a light-emitting unit 100, a moving part 208, a first pattern track 308, a first light-receiving unit 400, a second light-receiving unit 500, a memory unit 600, and a displacement calculating unit 700.

The moving part 208 does not rotate but makes a reciprocating motion in a straight line, unlike in the encoders 1, 2, 3, and 4 of FIGS. 1, 4, 7, and 10, respectively.

Also, a plurality of first unit patterns 320 of the first pattern tack 308 include a reflector, unlike in the encoders 1, 2, 3, and 4 of FIGS. 1, 4, 7, and 10, respectively. Widths of the first unit patterns 320 are different from one another.

The light-emitting unit 100 irradiates light on the first unit patterns 320, and light reflected from the first unit patterns 320 is detected by the first light-receiving unit 400 and the second light-receiving unit 500. The widths of the first unit patterns 320 may be calculated from a first signal S1 and a second signal S2, respectively, obtained by the first light-receiving unit 400 and the second light-receiving unit 500.

A mapping table is stored in the memory unit 600. The mapping table may include information in which an ordered pair of the width of the first unit patterns 320 detected by the first light-receiving unit 400 and the width of the first unit patterns 320 detected by the second light-receiving unit 500 corresponds to a displacement of the moving part 208.

Thus, the displacement calculating unit 700 receives the first signal S1 obtained by the first light-receiving unit 400 and the second signal S2 obtained by the second light-receiving unit 500, and then, refers to the mapping table stored in the memory unit 600, thereby calculating a relative displacement of the moving object 208 with respect to the light-receiving unit 100.

As described above, in the encoders according to the exemplary embodiments, even when a power supply of the encoders is cut off and then power is reintroduced to the encoders, the position of a moving part may be immediately checked, and the encoders may be manufactured with a small size and low costs. Also, as the number of first unit patterns and the number of first light-receiving units are increased, measurement resolution can be easily improved.

While the exemplary embodiments have been shown and described, it will be understood by those of ordinary skill in the art that various changes in form and details may be made therein without departing from the spirit and scope of the present inventive concept as defined by the following claims.

What is claimed is:

1. An encoder comprising:
a light-emitting unit which emits light;
a moving part which moves relative to the light-emitting unit;
a first pattern track which comprises a plurality of first unit patterns sequentially formed on the moving part, separated from one another and having different widths;
a first light-receiving unit which is disposed to correspond to the light-emitting unit, and detects first information about light received from the light-emitting unit via a first pattern of the first unit patterns;
at least one second light-receiving unit which is disposed to correspond to the light-emitting unit, and detects second information about light received from the light-emitting unit via at least one second pattern of the first unit patterns; and
a displacement calculating unit which calculates a relative displacement of the moving part with respect to a reference position based on the first and second information,
wherein the first light-receiving unit detects a width of the first pattern, in a direction parallel to a moving direction of the moving part, based on the first information, and the at least one second light-receiving unit detects each width of the at least one second pattern, in the direction, based on the second information,
wherein the displacement calculating unit calculates the relative displacement based on the width of the first pattern and the each width of the at least one second pattern, and
wherein the displacement calculating unit calculates the width of the first pattern and the each width of the at least one second pattern based on a speed of the moving part, a pulse width of the light received from the light-emitting unit via the first pattern and each pulse width of the light received from the light-emitting unit via the at least one second pattern.

2. An encoder comprising:

a light-emitting unit which emits light;

a moving part which moves relative to the light-emitting unit;

a first pattern track which comprises a plurality of first unit patterns sequentially formed on the moving part, separated from one another and having different widths;

a first light-receiving unit which is disposed to correspond to the light-emitting unit, and detects first information about light received from the light-emitting unit via a first pattern of the first unit patterns;

at least one second light-receiving unit which is disposed to correspond to the light-emitting unit, and detects second information about light received from the light-emitting unit via at least one second pattern of the first unit patterns; and a displacement calculating unit which calculates a relative displacement of the moving part with respect to a reference position based on the first and second information, wherein the encoder further comprises a motor which moves the moving part if a pulse signal is input to the motor, wherein the speed of the moving part is measured by using the pulse signal input to the motor.

3. An encoder comprising:

a light-emitting unit which emits light;

a moving part which moves relative to the light-emitting unit;

a first pattern track which comprises a plurality of first unit patterns sequentially formed on the moving part, separated from one another and having different widths;

a first light-receiving unit which is disposed to correspond to the light-emitting unit, and detects first information about light received from the light-emitting unit via a first pattern of the first unit patterns;

at least one second light-receiving unit which is disposed to correspond to the light-emitting unit, and detects second information about light received from the light-emitting unit via at least one second pattern of the first unit patterns; and a displacement calculating unit which calculates a relative displacement of the moving part with respect to a reference position based on the first and second information, wherein the displacement calculating unit calculates the relative displacement of the moving part based on a ratio of the first information with respect to the second information, and wherein the first and second information comprises a pulse width of the light received from the light-emitting unit via the first pattern and each pulse width of the light received from the light-emitting unit via the at least one second pattern, respectively.

4. An encoder comprising:

a light-emitting unit which emits light;

a moving part which moves relative to the light-emitting unit;

a first pattern track which comprises a plurality of first unit patterns sequentially formed on the moving part, separated from one another and having different widths;

a first light-receiving unit which is disposed to correspond to the light-emitting unit, and detects first information about light received from the light-emitting unit via a first pattern of the first unit patterns;

at least one second light-receiving unit which is disposed to correspond to the light-emitting unit, and detects second information about light received from the light-emitting unit via at least one second pattern of the first unit patterns; and a displacement calculating unit which calculates a relative displacement of the moving part with respect to a reference position based on the first and second information, wherein the encoder further comprises a memory unit which stores a mapping table comprising different values of the relative displacement and corresponding information about light received from the light-emitting unit via patterns among the first unit patterns, wherein the mapping table indicates that the relative displacement of the moving part corresponds to a combination of the first information and the second information, and wherein the first and second information comprises a pulse width of the light received from the light-emitting unit via the first pattern and each pulse width of the light received from the light-emitting unit via the at least one second pattern, respectively.

5. An encoder comprising:

a light-emitting unit which emits light;

a moving part which moves relative to the light-emitting unit;

a first pattern track which comprises a plurality of first unit patterns sequentially formed on the moving part, separated from one another and having different widths;

a first light-receiving unit which is disposed to correspond to the light-emitting unit, and detects first information about light received from the light-emitting unit via a first pattern of the first unit patterns;

at least one second light-receiving unit which is disposed to correspond to the light-emitting unit, and detects second information about light received from the light-emitting unit via at least one second pattern of the first unit patterns; and a displacement calculating unit which calculates a relative displacement of the moving part with respect to a reference position based on the first and second information, wherein the first unit patterns are formed in a direction parallel to a moving direction of the moving part, wherein the first unit patterns are configured such that, as the moving part moves, a ratio of the first information with respect to the second information, which is detected simultaneously with the first information, changes, and wherein the first information and the second information comprise a first pulse width of the light received from the light-emitting unit via the first pattern and a second each pulse width of the light received from the light-emitting unit via the at least one second pattern, respectively.

6. The encoder of claim 5, wherein the first pulse width and the second each pulse width correspond to a width of the first pattern and each width of the at least one second pattern, respectively.

7. An encoder comprising:

a light-emitting unit which emits light;

a moving part which moves relative to the light-emitting unit;

a first pattern track which comprises a plurality of first unit patterns sequentially formed on the moving part, separated from one another and having different widths;

a first light-receiving unit which is disposed to correspond to the light-emitting unit, and detects first information about light received from the light-emitting unit via a first pattern of the first unit patterns;

at least one second light-receiving unit which is disposed to correspond to the light-emitting unit, and detects second information about light received from the light-emitting unit via at least one second pattern of the first unit patterns; and a displacement calculating unit which calculates a relative displacement of the moving part with respect to a reference position based on the first and second information, wherein the first unit patterns are formed in a direction parallel to a moving direction of the moving part, wherein the first unit patterns are configured such that, as the moving part moves, a pair of the first information and the second information, which is detected simultaneously with the first information, changes, and wherein the first information and the second information comprise a first pulse width of the light received from the light-emitting unit via the first pattern and a second each pulse width of the light received from the light-emitting unit via the at least one second pattern, respectively.

8. The encoder of claim 7, wherein the first pulse width and the second each pulse width correspond to a width of the first pattern and each width of the at least one second pattern, respectively.

* * * * *